(12) United States Patent
Takami

(10) Patent No.: US 6,322,892 B1
(45) Date of Patent: Nov. 27, 2001

(54) CATION-POLYMERIZABLE COATING COMPOSITION

(75) Inventor: Seiji Takami, Chigasaki (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/327,556

(22) Filed: Jun. 8, 1999

(30) Foreign Application Priority Data

Jun. 8, 1998 (JP) .................................................. 10-158924

(51) Int. Cl.⁷ ..................................................... B32B 15/08
(52) U.S. Cl. .............................. 428/418; 522/66; 522/77; 522/67; 522/168; 522/170; 524/731; 428/410; 428/447; 427/386; 427/387; 427/487; 427/515
(58) Field of Search ................................. 522/77, 66, 67, 522/168, 170; 524/731; 428/447, 418; 427/386, 387, 487, 515, 500

(56) References Cited

U.S. PATENT DOCUMENTS

| | | |
|---|---|---|
| 4,631,208 | * 12/1986 | Westall . |
| 5,073,608 | * 12/1991 | Ona et al. . |
| 5,591,783 | * 1/1997 | Kobayashi et al. . |
| 5,721,020 | * 2/1998 | Takami et al. . |
| 5,958,116 | * 9/1999 | Kishihara et al. . |

FOREIGN PATENT DOCUMENTS

| | | |
|---|---|---|
| 9-291132 | 11/1997 | (JP) . |
| 10212343 | * 8/1998 | (JP) . |

OTHER PUBLICATIONS

"Contemporary Polymer Chemistry, Second Edition", Allcock et al., 1990 Prentice Hall, Englewood Cliffs, NJ 07632, p. 202–03.*

* cited by examiner

Primary Examiner—Robert Dawson
Assistant Examiner—Marc S. Zimmer
(74) Attorney, Agent, or Firm—Wenderoth, Lind & Ponack, L.L.P.

(57) ABSTRACT

There is disclosed a cation-polymerizable coating composition characterized by containing (A) a cation-polymerizable binder component consisting of (a) an epoxy group-containing compound and, as necessary, (b) an oxetane compound, (B) a modified dimethylsilicone oil with a number average molecular weight of 500–1,000,000 having a hydroxyl group(s) bonded directly to a silicon atom, a hydrolyzable functional group(s) bonded directly to a silicon atom and capable of forming a hydroxyl group (s) bonded directly to a silicon atom by hydrolysis, or a carboxyl group(s), and (C) a cation-polymerization initiator which forms a cation by irradiation or by heating. Said coating composition is suitable particularly for coating cans capable of forming a coating film having excellent adhesivity, processibility, hardness, initial lubricity and lubricity after the retort treatment.

23 Claims, No Drawings

CATION-POLYMERIZABLE COATING COMPOSITION

BACKGROUND OF THE INVENTION

1. Field of the Invention

The present invention relates to a cation-polymerizable coating composition capable of forming a coating film having excellent surface lubricity and its durability.

2. Description of the Prior Art

As a cation-polymerizable paint used to form a coating film for metal cans or metal cans coated with plastic film, paints containing an epoxy resin and a cation-polymerization initiator are known until now.

The curing of the coating film on the abovementioned metal cans or metal cans coated with plastic film after coating is conducted by baking for a short time or ultraviolet irradiation, on a high speed production line. Metal cans are transported to the next procedures such as inner surface coating step or processing step after the coating and curing. As the coating film is prone to be damaged during the transport, a silicon compound is usually mixed in the paint in order to give lubricity to the surface of the coating film. However, when a silicon compound is mixed in the paint, there tends to occur problems such as cissing at the coating film, whitening of the coating or deteriorated smoothness of the coating film.

In Japanese Laid-open Publication No.291132/1997 there is disclosed an ultraviolet-curing resin composition for metal can containing an epoxy compound, a modified dimethylpolysiloxane having as a side chain a polyoxyalkylene chain containing a hydroxyl group(s), a methoxy group(s) or a methylcarbonyloxy group(s) at the end, and a photocation-polymerization initiator. This publication describes that a coating film with excellent adhesivity, lubricity, retort resistance, coating film hardness, processibility, surface smoothness and transparency can be obtained by coating the composition on a metal can or a deep-drawn metal can coated with polyester film. However, a coating film obtained with the composition has a problem that the lubricity of the coating film after retort treatment is not sufficient.

The main purpose of the present invention is to provide a short time curing type cation-polymerizable coating composition capable of forming a coating film with excellent adhesivity to substrate, lubricity, retort resistance, coating film hardness, processibility, surface smoothness and transparency and, in addition, with excellent lubricity of the coating film after retort treatment.

Another purpose of the present invention is to provide a method of coating metal cans or metal cans coated with plastic film by using the above-mentioned coating composition.

A further purpose of the present invention is to provide an article such as a metal can or a metal can coated with plastic film, coated by using the above-mentioned coating composition.

Other purposes and features of the present invention will be clarified in the following description.

SUMMARY OF THE INVENTION

The present invention provides a cation-polymerizable coating composition characterized by containing (A) a cation-polymerizable binder component consisting of (a) an epoxy group-containing compound and, as necessary, (b) an oxetane compound, (B) a modified dimethylsilicone oil with a number average molecular weight of 500–1,000,000 having a hydroxyl group(s) bonded directly to a silicon atom, a hydrolyzable functional group(s) bonded directly to a silicon atom and capable of forming a hydroxyl group(s) bonded directly to a silicon atom by hydrolysis, or a carboxyl group(s), and (C) a cation-polymerization initiator which forms a cation by irradiation or by heating.

DETAILED DESCRIPTION OF THE INVENTION

The cation-polymerizable coating composition of the present invention is a coating composition curable by cationic polymerization by irradiation of ultraviolet rays etc. or by heating. The coating composition of the present invention is described more specifically as follows.

Cation-polymerizable Binder Component (A):

The cation-polymerizable binder component (A) constituting the coating composition of the present invention is a binder component which can be cured by cationic polymerization by irradiation of ultraviolet rays etc. or by heating and consists of an epoxy group-containing compound (a) and, as necessary, an oxetane compound (b).

As an epoxy group-containing compound (a), any compound containing more than one, preferably 1–4 epoxy groups per molecule can be used without special restriction and compounds containing an alicyclic epoxy group(s) having cyclohexene oxide or cyclopentene oxide structure in the molecule (a-1) and glycidyl group-containing compounds (a-2) can be preferably used.

As specific examples of the above-mentioned compounds containing an alicyclic epoxy group(s) (a-1) there can be mentioned, for example, dicyclopentadiene dioxide, limonene dioxide, (3,4-epoxycyclohexyl)methyl 3,4-epoxycyclohexanecarboxylate, 3-vinylcyclohexene oxide, bis(2,3-epoxycyclopentyl) ether, bis(3,4-epoxycyclohexylmethyl) adipate, bis(3,4-epoxy-6-methylcyclohexylmethyl) adipate, (3,4-epoxycyclohexyl) methyl alcohol, (3,4-epoxy-6-methylcyclohexyl)methyl 3,4-epoxy-6-methylcyclohexanecarboxylate, ethylene glycol bis (3,4-epoxycyclohexyl) ether, 3,4-epoxycyclohexenecarboxylic acid ethylene glycol diester, (3,4-epoxycyclohexyl)-ethyltrimethoxysilane,

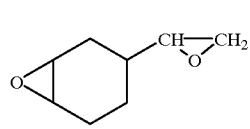

(1)

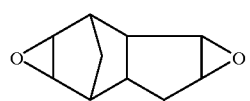

(2)

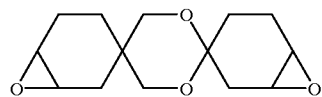

(3)

(4)

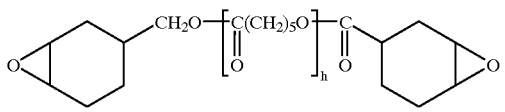

(wherein h is an integer of more than 1, particularly in the range of 1–5.)

(5)

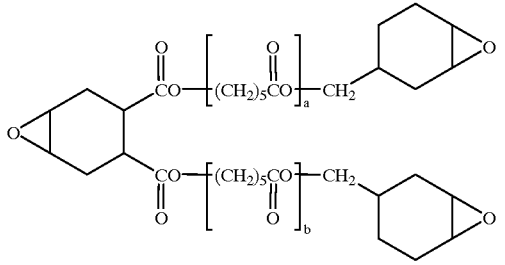

(wherein a and b each is an integer of more than 0, particularly in the range of 0–5.)

(6)

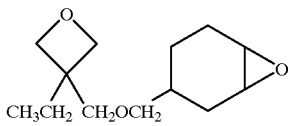

(7)

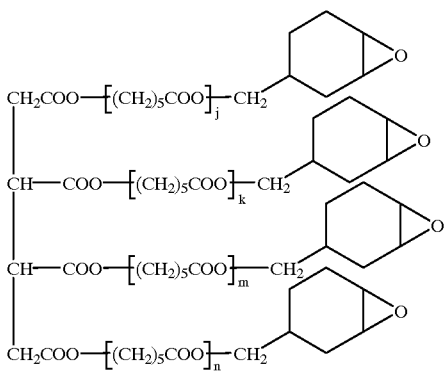

(wherein j, k, m and n each is an integer of more than 0, particularly in the range of 0–5.)

(8)

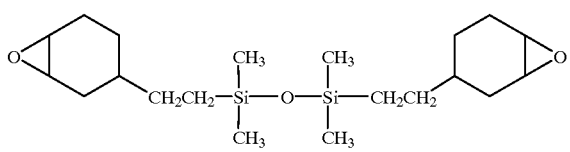

(9)

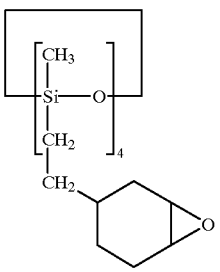

(co)polymers containing an alicyclic epoxy group(s) obtained by (co)polymerizing an ethylenic unsaturated monomer containing an alicyclic epoxy group(s) such as 3,4-epoxycyclohexylmethyl (meth)acrylate singly or with another polymerizable unsaturated monomer(s).

As specific examples of the aforementioned glycidyl group-containing compounds (a-2) there can be mentioned ethylene glycol diglycidyl ether, propylene glycol diglycidyl ether, polyethylene glycol diglycidyl ether, polypropylene glycol diglycidyl ether, 1,4-butanediol diglycidyl ether, neopentyl glycol diglycidyl ether, 1,6-hexanediol diglycidyl ether, glycerol diglycidyl ether, diglycerol tetraglycidyl ether, trimethylolpropane triglycidyl ether, spiroglycol diglycidyl ether, 2,6-diglycidyl phenyl ether, sorbitol polyglycidyl ether, triglycidyl isocyanurate, bisphenol A diglycidyl ether, butadiene dioxide, diglycidyl phthalate, 3-ethyl-3-glycidyloxetane, epoxidized polybutadiene, novolac type epoxy resin, epoxylated xylylenic resin; copolymers cntaining a glycidyl group(s) obtained by (co)polymerizing a glycidyl group-containing ethylenic unsaturated monomer such as glycidyl (meth)acrylate singly or another polymerizable unsaturated monomer(s).

As other polymerizable unsaturated monomers used for the preparation of the aforementioned copolymers containing an alicyclic epoxy group(s) or the above-mentioned copolymers containing a glycidyl group(s) there can be mentioned, for example, $C_{1-24}$ alkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, n-octyl (meth)acrylate, lauryl (meth)acrylate, tridecyl (meth)acrylate, stearyl (meth)acrylate etc.; epoxy group-containing polymerizable unsaturated monomers such as glycidyl (meth)acrylate, methylglycidyl (meth)acrylate, 3,4-epoxycyclohexylmethyl (meth)acrylate, allyl glycidyl ether, vinyl glycidyl ether etc.; monoester compounds of polyhydric alcohols with acrylic acid or methacrylic acid such as 2-hydroxyethyl (meth)acrylate, hyddroxypropyl (meth)acrylate, 2,3-dihydroxybutyl (meth)acrylate, 4-hydroxybutyl (meth)acrylate, polyethylene glycol mono(meth)acrylate etc.; hydroxyl group-containing monomers such as compounds obtained by ring-opening polymerization of ε-caprolactone to the above-mentioned monoester compounds of polyhydric alcohols with acrylic acid or methacrylic acid; carboxyl group-containing polymerizable unsaturated monomers such as acrylic acid, methacrylic acid, maleic acid, maleic anhydride etc.; aminoalkyl (meth)acrylates such as N,N-dimethylaminoethyl (meth)acrylate, N,N-diethylaminoethyl (meth)acrylate, N,N-dimethylaminopropyl (meth)acrylate etc.; (meth)acrylamide or their derivatives such as acrylamide, methacrylamide, N,N-dimethylaminoethyl-(meth)acrylamide, N,N-diethylaminoethyl-(meth)acrylamide, N,N-dimethylaminopropyl-(meth)acrylamide, N-methylolacrylamide, N-methylolacrylamide methyl ether, N-methylolacrylamide butyl ether etc.; compounds having an oxetane ring(s) and an ethylenic unsaturated group(s) in the molecule obtained by reacting a hydroxyl group-containing oxetane such as 3-ethyl-3-hydroxymethyloxetane etc. with an unsaturated monomer containing a functional group(s) which reacts with said hydroxyl group(s) but does not substantially react with oxetane ring (for example, isocyanate group, methyl ester etc.) and ethylenic unsaturated group (acryloyl group, methacryloyl group, vinyl group etc.) (for example, 2-isocyanatoethyl (meth)acrylate, m-isopropenyl-α,α-dimethylbenzyl isocyanate, methyl (meth)acrylate etc.); styrene, acrylonitrile, methacrylonitrile, vinyl acetate etc. These compounds can be used singly or in combination of more than two. In the present invention "(meth)acrylate" means acrylate or methacrylate and "(meth)acrylamide" means acrylamide or methacrylamide.

The above-mentioned epoxy group-containing compound (a) is usually preferable when the molecular weight is in the range of 100–10,000, particularly 150–1,000 and the epoxy equivalent is in the range of generally 50–5,000, particularly 50–500 in view of cation-polymerization reactivity etc.

As an epoxy group-containing compound (a) which is particularly preferable in the present invention, there can be mentioned, among the above-mentioned, dicyclopentadiene dioxide, limonene dioxide, (3,4-epoxycyclohexyl)methyl 3,4-epoxycyclohexanecarboxylate, 3-vinylcyclohexene oxide, bis(2,3-epoxycyclopentyl) ether, compounds represented by the following formulae, etc.

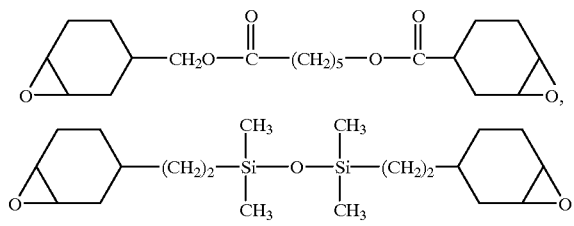

Oxetane compounds (b) which are used, as necessary, in addition to the above-mentioned epoxy group-containing compounds (a) as a cation-polymerizable binder component (A) are other compounds than the above-mentioned epoxy group-containing compounds (a) and are compounds containing at least one, preferably 1–4 oxetane rings represented by the following formula

 (10)

in the molecule. As their specific examples there can be mentioned, for example, 3-ethyl-3-methoxymethyloxetane, 3-ethyl-3-ethoxymethyloxetane, 3-ethyl-3-butoxymethyloxetane, 3-ethyl-3-hexyloxymethyloxetane, 3-ethyl-3-allyloxymethyloxetane, 3-methyl-3-hydroxymethyloxetane, 3-ethyl-3-hydroxymethyloxetane, 3-ethyl-3-(2'-hydroxyethyl)oxymethyloxetane, 3-ethyl-3-(2'-hydroxy-3'-phenoxypropyl)oxymethyloxetane, 3-ethyl-3-(2'-hydroxy-3'-butoxypropyl)oxymethyloxetane, 3-ethyl-3-[(2'-(2"-ethoxyethyl)oxymethyl]oxetane, 3-ethyl-3-(2'-butoxethyl)oxymethyloxetane, 3-ethyl-3-benzyloxymethyloxetane, 3-ethyl-3-(p-tert-butylbenzyloxymethyl)oxetane, 3-ethyl-3-glycidyloxymethyloxetane, 3-ethyl-3-(3,4-epoxycyclohexylmethyl)oxymethyloxetane, bis(3-ethyloxetanyl-3-methyl) oxide, compounds having a polymerizable unsaturated group(s) and an oxetane ring(s) [for example, copolymers having an oxetane ring(s) obtained by a radical copolymerization using 3-ethyl-3-(acryloyloxyethyl)oxymethyloxetane as one of the monomer components]; compounds represented by the following formulae

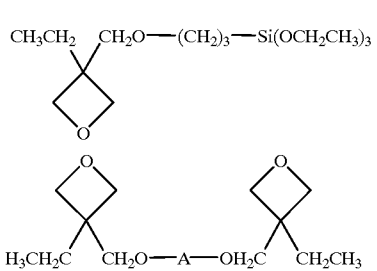 (11)

(wherein A represents a bivalent hydrocarbon group with 1–30 carbon atoms which may contain a hetero atom(s) such as oxygen atom.)

In the compound represented by the above-mentioned formula (11), as A in the formula, there can be mentioned, for example, straight chain, branched chain or cyclic alkylene group (particularly alkylene group with 1–15 carbon atoms such as methylene, ethylene, propylene, butylene, cyclohexylene group etc.), polyalkyleneoxy group of 4–30, preferably 4–8 carbon atoms, (for example, poly(ethyleneoxy), poly(propyleneoxy) group etc.), phenylene group, xylylene group, bivalent aromatic hydrocarbon group represented by the following formula

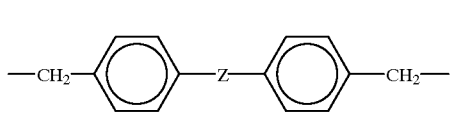 (12)

(wherein Z represents O, S, $CH_2$, NH, SO, $SO_2$, $C(CF_3)_2$ or $C(CH_3)_2$.)

As particularly preferable compounds in the present invention among the above-mentioned oxetane compounds (b), there can be mentioned 3-ethyl-3-butoxymethyloxetane, 3-ethyl-3-hexyloxymethyloxetane, 3-ethyl-3-methoxymethyloxetane, 3-ethyl-3-ethoxymethyloxetane, 3-ethyl-3-hydroxymethyloxetane, bis(3-ethyloxetanyl-3-methyl) oxide, compound represented by the following formula

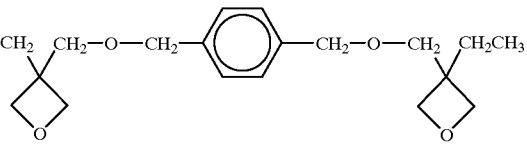

The mixing ratios of the aforementioned epoxy group-containing compound (a) and the above-mentioned oxetane compound (b) based upon the total of both can be usually in the following ranges:

Epoxy group-containing compound (a): 20–100% by weight, preferably 40–90% by weight and more preferably 50–80% by weight.

Oxetane compound (b): 0–80% by weight, preferably 10–60% by weight and more preferably 20–50% by weight.

The hardness, retort resistance and processability of the obtained coating film can be further improved by jointly using the above-mentioned oxetane compound (b) in addition to the aforementioned epoxy group-containing compound (a) as a cation-polymerizable binder component (A).

Modified Dimethysilicone Oil (B):

Modified dimethylsilicone oil (B) is mixed in the coating composition of the present invention for the purpose of improving the lubricity of the coating film obtained from the coating composition of the present invention.

Modified dimethylsilicone oil (B) has a hydroxyl group(s) bonded directly to a silicon atom, a hydrolyzable functional group(s) bonded directly to a silicon atom and capable of forming a hydroxyl group(s) bonded directly to a silicon atom by hydrolysis, or a carboxyl group(s) in a side chain or at the end of the molecule. In view of the low volatility at the time of coating film formation and the lubricity of the obtained coating film, the modified dimethylsilicone oil preferably has a number average molecular weight in the range of 500–1,000,000, more preferably 1,000–100,000 and even more preferably 2,000–50,000. Such a modified dimethylsilicone oil may usually have a viscosity of more than 50 centistokes at 20° C. and may be solid at normal temperature.

As the above-mentioned hydrolyzable functional group which can form a hydroxyl group (silanol group) bonded directly to a silicon atom by hydrolysis, there can be mentioned, for example, alkoxyl groups of 1–6 carbon atoms and alkanoyloxy groups of 2–6 carbon atoms which are bonded directly to a silicon atom. Above all, methoxy group, ethoxy group, acetoxy group are preferable.

Also, a modified dimethylsilicone oil (B) has preferably a phenyl group(s) at a part of side chain and/or end, or is preferably polyether-modified at a part of side chain and/or end, particularly containing a polyoxyethylene chain(s).

Thus, as a preferable substance as modified dimethylsilicone oil (B) there can be mentioned, for example, compounds represented by the following formula:

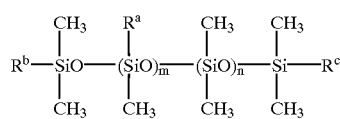
(13)

wherein each of a plurality of $R^a$, $R^b$ and $R^c$ is identical or different and represents methyl group, phenyl group, —$(CH_2)_k$—COOH (wherein k is an integer of 2–6), hydroxyl group, methoxy group, ethoxy group, acetoxy group or polyoxyalkylene group represented by the following formula (14) or (15)

(14)

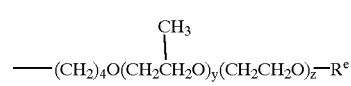
(15)

where $R^d$ and $R^e$ each represents a hydrogen atom, methyl group or acetyl group and x, y and z each represents an integer of 10–50, and at least one group among a plurality of $R^a$, $R^b$ and $R^c$ represents a hydroxyl group, methoxy group, ethoxy group, acetoxy group or the above-mentioned —$(CH_2)_k$—COOH, and m represents a number of 3–50 and n represents a number of 30–200.

In the modified dimethylsilicone oil represented by the formula (13), each $R^a$ at the m pieces of the repeated units of the formula (13) may be identical or different. In the formula (13) m pieces of the repeated units

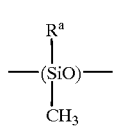
(16)

and n pieces of the repeated units

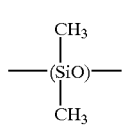
(17)

may be arranged freely, either at random or in block in the molecule.

In the modified dimethylsilicone oil represented by the formula (13), m is preferably a number of 3–50, particularly 5–30 and n is preferably a number of 30–200, particularly 40–150 in view of the compatibility with other components, appearance of the obtained coating film and lubricity of the coating film.

Mixing amount of the modified dimethylsilicone oil (B) in the coating composition of the present invention can be in the ranges of generally 0.01–20 parts by weight, preferably 0.1–10 parts by weight and more preferably 0.2–5 parts by weight per 100 parts by weight of the cation-polymerizable binder component (A).

Cation-polymerization Initiator (C):

Cation-polymerization initiator (C) is mixed in order to promote the ring-opening cationic polymerization of alicyclic epoxy groups in the binder component (A) in the coating composition of the present invention and oxetane rings existing as necessary by irradiation of ultraviolet rays etc. or by heating and smoothly conduct the curing of the coating film to be formed. As a cation-polymerization initiator (C) there can be mentioned cation-polymerization initiators which form substances to initiate a cationic polymerization such an acid by irradiation of ultraviolet rays etc. or by heating, including, for example, hexafluoroantimonate salt, pentafluorohydroxyantimonate salt, hexafluorophosphate salt, hexafluoroarsenate salt, tetrakis(pentafluorophenyl) borate salt, aromatic sulphonium salt and other cation-polymerization initiators.

As the above-mentioned cation-polymerization initiator there can be mentioned, for example, compounds represented by the following formulae (I)–(XIV):

(I)

wherein Ar represents an aryl group, for example, a phenyl group; and $X^-$ represents $BF_4^-$, $PF_6^-$, $SbF_5(OH)^-$, $BbF_6^-$, $AsF_6^-$ or a group the following formula:

(II)

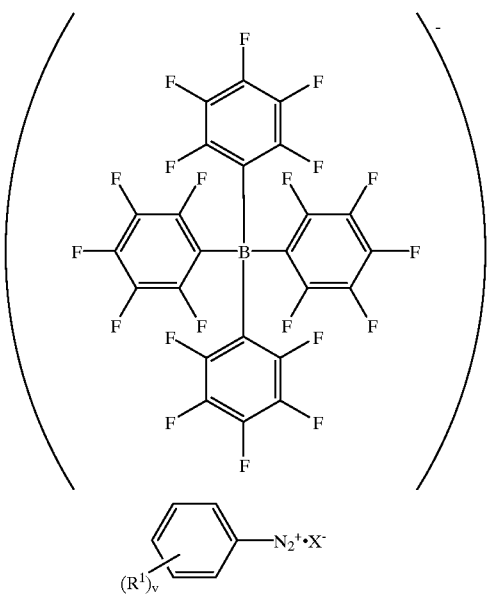

wherein R¹ represents an alkyl group of 1–12 carbon atoms or an alkoxy group of 1–12 carbon atoms; v represents an integer of 0–3; and X⁻ has the same meaning as mentioned above, (III)

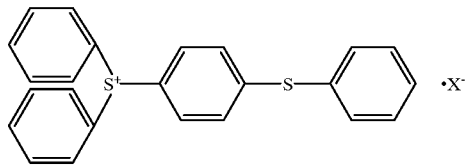 ·X⁻ wherein X⁻ has the same meaning as mentioned above, (IV)

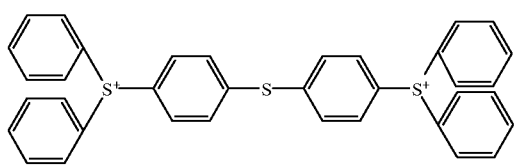 ·2X⁻ wherein X⁻ has the same meaning as mentioned above, (V)

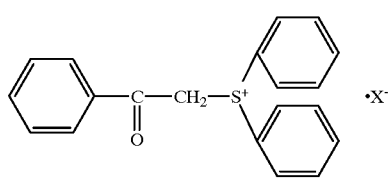 ·X⁻ wherein X⁻ has the same meaning as mentioned above, (VI)

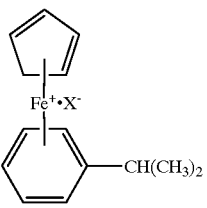

wherein X⁻ has the same meaning as mentioned above, (VII)

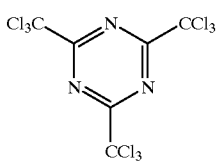

(VIII)

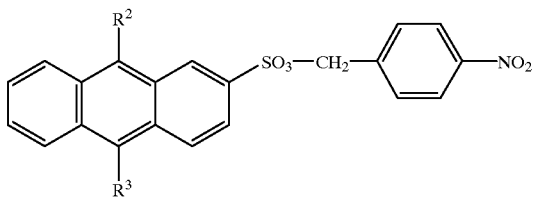

wherein R² and R³ each independently represents an alkyl group of 1–12 carbon atoms or an alkoxy group of 1–12 carbon atoms, (IX)

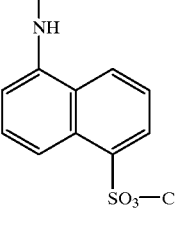

(X)

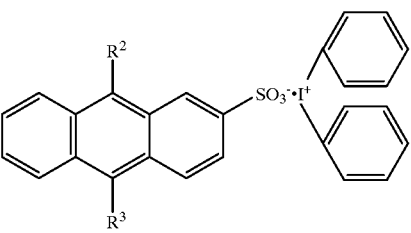

wherein R² and R³ each has the same meaning as mentioned above, (XI)

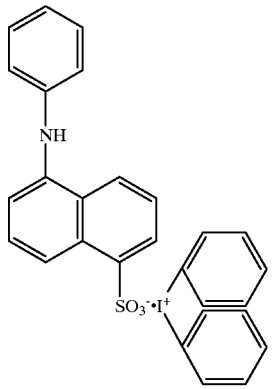

(XII)

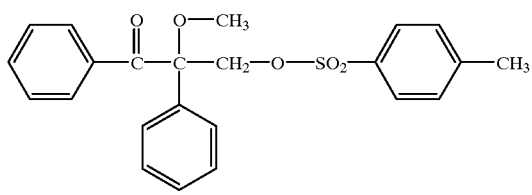

(XIII)

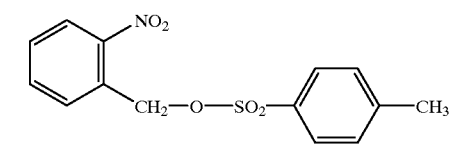

(XIV)

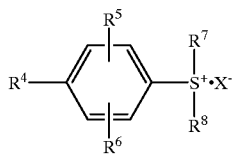

wherein $R^4$ represents a hydrogen atom, a hydroxyl group, an alkoxy group or a group of the following formula:

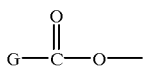

in which G represents an optionally substituted alkyl group, an optionally substituted alkoxy group, an optionally substituted phenyl group or an optionally substituted phenoxy group; $R^5$ and $R^6$ each independently represents a hydrogen atom, a halogen atom or an alkyl group; $R^7$ and $R^8$ each independently an optionally substituted alkyl group, an optionally substituted aryl group or an optionally substituted aralkyl group; and $X^-$ has same the meaning as mentioned above.

As a cation-polymerization initiator there can be mentioned, besides the above-mentioned, boron trifluoride, tetraethylammonium bromide etc., too.

Among the above-mentioned cation-polymerization initiators, as a photocation-polymerization initiator, compounds having hexafluorophosphate anion ($PF_6^-$) are preferable in view of the toxicity, general-purpose applicability etc.

As a photocation-polymerization initiator, commercial products such as Cyracure UVI-6970, Cyracure UVI-6974 and Cyracure UVI-6990 (these are products of Union Carbide Corporation of U.S.), Irgacure 264 (a product of Ciba Geigy Co.) and CIT-1682 (a product of Nippon Soda Co., Ltd.) can be used.

Among the above-mentioned cation-polymerization initiators, as a thermocation-polymerization initiator, aromatic sulphonium salts represented by the above-mentioned formula (XIV) are preferable. The above-mentioned aromatic sulphonium salts give an excellent low temperature curability to the coating composition of the present invention, can cure a coating film from the coating composition of the present invention by heating at higher than about 80° C., and do not deteriorate the storage stability, because they do not show any catalytic action at normal temperature.

As specific examples of the aromatic sulphonium salts represented by the above-mentioned formula (XIV) there can be mentioned, for example, benzyl-4-hydroxyphenylmethylsulphonium hexafluoroantimonate, benzyl-4-hydroxyphenylmethylsulphonium hexafluorophosphate, 4-acetoxyphenylbenzylmethylsulphonium hexafluoroantimonate, 4-acetoxyphenyldimethylsulphonium hexafluoroantimonate, benzyl-4-methoxyphenylmethylsulphonium hexafluoroantimonate, benzyl-2-methyl-4-hydroxyphenylmethylsulphonium hexafluoroantimonate, benzyl-3-chloro-4-hydroxyphenylmethylsulphonium hexafluoroarsenate, benzyl-3-methyl-4-hydroxy-5-tert-butylphenylmethylsulphonium hexafluoroantimonate, 4-methoxybenzyl-4-hydroxyphenylmethylsulphonium hexafluorophosphate, dibenzyl-4-hydroxyphenylsulphonium hexafluoroantimonate, dibenzyl-4-hydroxyphenylsulphonium hexafluorophosphate, 4-acetoxyphenyldibenzylsulphonium hexafluoroantimonate, dibenzyl-4-methoxyphenylsulphonium hexafluoroantimonate, nitrobenzyl-4-hydroxyphenylmethylsulphonium hexafluoroantimonate, 3,5-dinitrobenzyl-4-hydroxyphenylmethylsulphonium hexafluoroantimonate, β-naphthylmethyl-4-hydroxyphenylmethylsulphonium hexafluoroantimonate etc.

As commercial products of the aromatic sulphonium salts represented by the above-mentioned formula (XIV) there can be mentioned, for example, SANAID SI-L85, SANAID SI-L110, SANAID SI-L145, SANAID SI-L160, SANAID SI-H15, SANAID SI-H20, SANAID SI-H25, SANAID SI-H40, SANAID SI-H50, SANAID SI-60L, SANAID SI-80L, SANAID SI-100L, SANAID SI-80, SANAID SI-100 (these are all products of Sanshin Chemical Industry Co., Ltd.).

Mixing amount of the cation-polymerization initiator (C) in the coating composition of the present invention can be in the ranges of usually 0.01–20 parts by weight, preferably 0.1–10 parts by weight and more preferably 0.5–5 parts by weight per 100 parts by weight of the cation-polymerizable binder component (A).

Coating Composition:

The coating composition of the present invention contains as essential components the above-mentioned cation-polymerizable binder component (A), modified dimethyl-silicone oil (B) and cation-polymerization initiator (C) and can further contain, as necessary, lubricity-imparting agents; modifying resins such as polyol resins, phenolic resins, acrylic resins, polyester resins, polyolefin resins, polybutadiene resins etc.; organic resin fine particles, pigments dyestuffs, solvents etc. The above-mentioned lubricity-imparting agents are mixed in order to further improve the lubricity of the obtained coating film by jointly using the aforementioned modified dimethylsilicone oil (B) and include waxes such as a fatty acid ester wax which is an esterified product of a polyol compound and a fatty acid, silicone type wax, fluorine-containing wax, polyolefin wax, animal wax, vegetable wax etc. Mixing amount of the lubricity-imparting agent, in case of being used, is not particularly limited but usually less than 10 parts by weight, particularly in the range of 0.5–5 parts by weight per 100 parts by weight of the cation-polymerizable binder component (A).

In case the above-mentioned modifying resin is mixed, it can be used in the range of usually 1–30 parts by weight, paticularly 1–15 parts by weight per 100 parts by weight of the cation-polymerizable binder component (A).

The coating composition of the present invention can be prepared by mixing the above-mentioned individual components and stirring the mixture so as to obtain a uniform coating composition. For example, the individual components are mixed, heated as necessary (to about 50° C., for example), and stirred by using a stirrer, such as a dissolver, for about 10 minutes, for example, until a uniform composition is prepared. In case of mixing pigments, it may be possible that they are previously mixed with the cation-polymerizable binder, and a solvent as necessary, to conduct a pigment dispersion by using a pigment disperser, such as a sandmill, attritor etc. and then mixed and stirred with other components.

Coating Method:

As a substrate on which the cation-polymerizable coating composition of the present invention can be coated there can be mentioned, for example, metal plates such as tinplate, aluminium, tin-free steel, iron, zinc, copper, zinc-plated steel, steel plated with an alloy of zinc and other metal; chemically treated metal plates such as these metals subjected to phosphate treatment or chromate treatment; resin film-laminated metal plates obtained by laminating, on these metal plates or chemically treated metal plates, a film of a resin such as polyester resin, such as polyethylene terephthalate, polyolefin resin, such as polyethylene or polypropylene, polyamide resin, epoxy resin, polyvinyl chloride etc.; molded articles such as cans made by processing these metal plates, chemically treated metal plates or resin film-laminated metal plates; wood, plastics, concrete and the like.

The coating composition of the present invention is particularly preferable as a clear paint for outer surface of cans. As a coating surface of the above-mentioned substrates, particularly surfaces of metal plates, chemically treated metal plates or resin film-laminated metal plates which become outer surfaces of cans when being molded into cans after the coating, and surfaces on which a coating film of white coat etc. or an ink layer is formed on these surfaces; outer surfaces of cans made by being molded of metal plates, chemically treated metal plates or resin film-laminated metal plates, on which a coating film of white coat etc. or an ink layer may have been formed, are suitable.

The coating composition of the present invention can be coated by a per se known method such as roll coating, spray coating, brush coating, bar coating, roller coating, silk screen printing or the like. The thickness of the coating film is not particularly limited, but can be usually in the range of about 2 to about 20 $\mu$m as dried film thickness and is preferable about 2 to about 8 $\mu$m, particularly in case of being used in an application for cans.

The coating composition of the present invention can be cured by heating or by irradiation with ultraviolet rays etc. after coating. A suitable curing condition in case of a thermal curing is usually 5 seconds to 30 minutes at about 80–400° C. and preferably 10 seconds to 10 minutes at 130–350° C. In case of curing by irradiation with ultraviolet rays etc., when the coating film contains a solvent, it can be irradiated after removing the solvent by heating etc. The condition for irradiation may be appropriately selected depending upon the kind of the coating composition used, the thickness of film etc. The appropriate wavelength of the ultraviolet rays applied is usually in the range of 200–450 nm and an irradiation source having a wavelength of high sensitivity can appropriately be selected and used.

As an ultraviolet source there can be mentioned, for example, a high pressure mercury lamp, an ultrahigh pressure mercury lamp, a xenon lamp, a carbon arc, a metal halide lamp and a sunlight. The appropriate UV amount applied to the coating film is in the ranges of usually 1–1,000 mJ/cm$^2$, particularly 50–500 mJ/cm$^2$.

Moreover, the coating film may be heated, as necessary, after irradiation with ultraviolet rays. The heating may reduce the amount of unreacted substances in the coating film and relax strain of coating film generated by film curing by UV irradiation and molding. The heating may also improve the hardness and adhesivity of the coating film. The above-mentioned heating can be conducted usually at an atmospheric temperature of 150–400° C. for 5 seconds to 30 minutes.

EXAMPLES

The present invention is hereinafter described more specifically by way of Examples. In the following, "parts" and "%" are by weight.

Example 1

100 parts of Cyracure UVR-6110 (an alicyclic epoxy group-containing compound; a product of Union Carbide Corporation of U.S.), 3.0 parts of SILWET L-9000(100) (a modified dimethylsilicone oil containing silanol groups, number average molecular weight: about 5.000, viscosity: 100 centistokes, silanol group equivalent: about 2,500; a product of Nippon Unicar Co., Ltd.) and 5.0 parts of Cyracure UVI-6990 (an aromatic sulphonium salt type photocation-polymerization initiator; a product of Union Carbide Corporation of U.S.) were mixed and stirred at 50° C. for 20 minutes to obtain an ultraviolet-curing coating composition.

Examples 2–6 and Comparative Examples 1–4

Operations were conducted in the same manner as in Example 1 in using the components in the mixing proportions shown in the Table 1 mentioned later to obtain various ultraviolet-curing coating compositions.

Example 7

100 parts of Cyracure UVR-6110, 1.0 part of SILWET L-9000(8000) (a modified dimethylsilicone oil containing silanol groups, number average molecular weight: about 50.000, viscosity: 8,000 centistokes, silanol group equivalent: about 30,000; a product of Nippon Unicar Co., Ltd., Japan) and 5.0 parts of SANAID SI-100 (an aromatic sulphonium salt type thermocation-polymerization initiator; a product of Sanshin Chemical Industry Go., Ltd.) were mixed and stirred for 20 minutes to obtain a thermocuring coating composition.

Example 8

An operation was conducted in the same manner as in Example 7 in using the components in the mixing proportions shown in the Table 1 mentioned later to obtain a thermocuring coating composition.

"Note" in Table 1 each means aw follows:

(*1) GOX means 3-ethyl-3-(glycidyloxymethyl)-oxetane represented by the following formula:

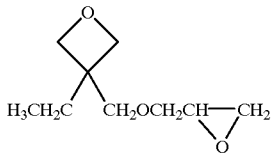

(*2) EOXA means 3-ethyl-3-hydroxymethyloxetane.

(*3) XD0 means a compound having 2 oxetane rings represented by the following formula:

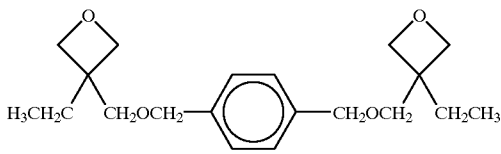

(*4) FZ-3703: "SILWET FZ-3703", a modified dimethylsilicone oil containing carboxyl groups, number average molecular weight: about 4.000, viscosity: 3,000 centistokes, carboxyl group equivalent: about 3,600; a product of Nippon Unicar Co., Ltd.).

(*5) X-22–3701E: a modified dimethylsilicone oil containing carboxyl groups, number average molecular weight: about 4,000, viscosity: 3,000 centistokes, carboxyl group equivalent: about 3,800; a product of Shin-Etsu Silicone Co., Ltd.).

(*6) FZ-3778: "SILLWET FZ-3778", a modified dimethylsilicone oil containing ethoxy groups bonded directly to silicon atom, number average molecular weight: about 4,000, viscosity: 60 centistokes; a product of Nippon Unicar Co., Ltd.).

(*7) X-22–176DX: a modified dimethylsilicone oil containing hydroxyl groups bonded to carbon atom, number average molecular weight: about 4,000, viscosity: 110 centistokes, hydroxyl value: about 30 mgKOH/g; a product of Shin-Etsu Silicone Co., Ltd.).

(*8) KF-102: a modified dimethylsilicone oil containing epoxy groups, number average molecular weight: about 4,000, viscosity: 4,000 centistokes, epoxy equivalent: about 3,600; a product of Shin-Etsu Silicone Co. , Ltd.).

(*9) TSL9986: a modified dimethylsilicone oil containing epoxy groups, number average molecular weight: about 1,000; a product of Shin-Etsu Silicone Co., Ltd.).

(*10) Paint-Add 54: polyether-modified dimethylsilicone oil, number average molecular weight: about 4,000, viscosity: 160 centistokes; a product of Dow Corning Corporation).

Preparation of Coated Plates for Testing

Each of the coating compositions obtained in the above-mentioned Examples and Comparative Examples was coated on a PET steel plate obtained by heat-and-pressure-laminating a PET (polyethylene terephthalate) sheet of 15 μm in thickness on a tin-free steel plate of 0.20 mm in thickness, so as to give a coating film of 5 μm dried film thickness. Each of the coated compositions was cured to obtain each coated plate for testing.

The plates coated with the paints obtained in Examples 1–6 and Comparative Examples 1–4 were irradiated with ultraviolet rays by using a metal halide lamp (160 W/cm) from a distance of 10 cm so that the UV amount applied became 200 mJ/cm$^2$ and then cured by baking at 200° C. for 30 seconds to obtain coated plates for testing.

The plates coated with the paints obtained in Examples 7 and 8 were cured, without ultraviolet irradiation, by baking at 200° C. for 90 seconds to obtain coated plates for testing.

Each coated plate for testing was tested by the following test methods. All the tests were conducted in a room at 20° C.

Test results are shown in Table 1 mentioned later.

Test Methods

Adhesivity: On a coated plate for testing there was cut a cross-cut reaching the substrate passing through the paint film with a knife. An adhesive cellophane tape was adhered to the cross-cut part and the degree of peeling of the coating film was judged according to the following standards, when the tape was peeled in an instant.

⊚: Coating film peeling is not observed at all.

○: Coating film peeling is observed slightly.

Δ: Coating film peeling is observed considerably.

X : Coating film peeling is observed remarkably.

Pencil hardness: Pencil scratch test was conducted on the coated plate for testing, according to JIS K-5400 8.4.2 (1990). Evaluation was made by the breakage method.

Processibility: In accordance with JIS K-5400 8.4.2 (1990) DuPont impact resistance test, PET film face was hit from the backside under the conditions of falling weight: 500 g, diameter of impact point: ½ inches, falling height: 50 dm. Peeling condition of the molded portion and its vicinity was observed and judged according to the following standards.

⊚: No peeling is observed at coating film and PET film.

○: Slight peeling of coating film is observed, but no peeling of PET film.

Δ: Considerable peeling is observed either at coating film or PET film.

X: Remarkable peeling is observed either at coating film or PET film.

Retort resistance: After the coated plate for testing was immersed in boiling water of 125° C. in an autoclave for 30 minutes, the appearance of the coated surface was observed and evaluated according to the following standards.

⊚: No change is observed in the appearance of the coated surface.

○: Transparency of the coated film is slightly declined.

Δ: Transparency of the coated film is considerably declined.

X: Transparency of the coated film is remarkably declined.

Lubricity: Kinetic friction coefficient at a moving velocity of 10 cm/minute was measured by using Egan slip tester (made by Thwing Albert Instrument Co., U.S.A.) and putting a 1 kg 3-point contact type steel ball weight on the coated plate for testing. In addition, kinetic friction coefficient was measured in the same manner in using the coated plate for testing with which the same retort treatment as in the above-mentioned retort resistance test had been conducted. These kinetic friction coefficients and the rate of lubricity retention after retort treatment (%) according to the following calculation formula are recorded.

Rate of lubricity retention=(Initial kinetic friction coefficient/Kinetic friction coefficient after retort treatment)×100

TABLE 1

|  |  | Example |  |  |  |  |  |  |  | Comparative Example |  |  |  |
|---|---|---|---|---|---|---|---|---|---|---|---|---|---|
|  |  | 1 | 2 | 3 | 4 | 5 | 6 | 7 | 8 | 1 | 2 | 3 | 4 |
| Cyracure UVR-6110 |  | 100 | 50 | 100 | 100 | 100 | 100 | 100 | 70 | 100 | 100 | 100 | 100 |
| GOX | (*1) |  |  |  |  |  |  |  | 15 |  |  |  |  |
| EOXA | (*2) |  | 20 |  |  |  |  |  |  |  |  |  |  |
| XDO | (*3) |  | 30 |  |  |  |  |  |  |  |  |  |  |
| SILWET L-9000 (100) |  | 3.0 | 3.0 |  |  |  |  |  |  |  |  |  |  |
| SILWET L-9000 (8000) |  |  |  | 1.0 |  |  |  | 1.0 | 1.0 |  |  |  |  |
| FZ-3703 | (*4) |  |  |  | 0.5 |  |  |  |  |  |  |  |  |
| X-22-3701E | (*5) |  |  |  |  | 3.0 |  |  |  |  |  |  |  |
| FZ-3778 | (*6) |  |  |  |  |  | 2.0 |  |  |  |  |  |  |
| X-22-176DX | (*7) |  |  |  |  |  |  |  |  | 2.0 |  |  |  |
| KF-102 | (*8) |  |  |  |  |  |  |  |  |  | 2.0 |  |  |
| TSL9986 | (*9) |  |  |  |  |  |  |  |  |  |  | 2.0 |  |
| Paint-Add54 | (*10) |  |  |  |  |  |  |  |  |  |  |  | 2.0 |
| Cyracure UVI-6990 |  | 5.0 | 2.0 | 5.0 | 5.0 | 5.0 | 2.0 |  |  | 5.0 | 5.0 | 5.0 | 5.0 |
| SANAIDSI-100 |  |  |  |  |  |  | 2.0 | 5.0 | 5.0 |  |  |  |  |
| Test results | Adhesivity | ⊚ | ⊚ | ⊚ | ⊚ | ⊚ | ⊚ | ⊚ | ⊚ | ⊚ | ⊚ | ⊚ | ⊚ |
|  | Pencil hardness | 2H | 3H | 2H | 2H | 2H | 3H | 3H | 3H | 2H | 2H | 2H | 2H |
|  | Processibility | ○ | ⊚ | ○ | ○ | ○ | ○ | ○ | ⊚ | ○ | ○ | ○ | ○ |
|  | Retort resistance | ○ | ⊚ | ○ | ○ | ○ | ○ | ○ | ⊚ | ○ | ○ | ○ | ○ |
|  | Lubricity Before retort treatment | 0.10 | 0.08 | 0.06 | 0.06 | 0.10 | 0.07 | 0.07 | 0.06 | 0.08 | 0.05 | 0.09 | 0.06 |
|  | After retort treatment | 0.10 | 0.08 | 0.06 | 0.07 | 0.11 | 0.10 | 0.08 | 0.06 | 0.22 | 0.39 | 0.31 | 0.28 |
|  | Rate of lubricity retention | 100 | 100 | 100 | 86 | 91 | 70 | 88 | 100 | 36 | 13 | 29 | 21 |

Obviously from the results shown in the above-mentioned Table 1, by using the coating composition of the present invention, a coating film having excellent adhesivity to substrate, lubricity, retort resistance, coating film hardness, processibility, surface smoothness, transparency and, in addition, excellent lubricity of the coating film after retort treatment can be formed by a short time ultraviolet irradiation or a short time baking. The reason why the lubricity of the coating film after retort treatment is excellent is considered to be that due to the reaction between the epoxy group in the cation-polymerizable binder component (A) and the silanol group or carboxyl group in the modified dimethylsilicone oil (B) the component (A) and the component (B) bond together and therefore the modified dimethylsilicone oil (B) remains in the coating film undissolved by the retort treatment. Thus, the coating composition of the present invention is used preferably as a paint for the outer surface of cans, such as drink cans or food cans, and the like.

What is claimed is:

1. A cation-polymerizable coating composition comprising (A) a cation-polymerizable binder component consisting of (a) an epoxy group-containing compound selected from the group consisting of dicyclopentadiene dioxide, limonene dioxide, (3,4-epoxycyclohexyl) methyl 3,4-epoxycyclohexanecarboxylate, 3-vinylcyclohexene oxide, bis(2,3-epoxycyclopentyl) ether, compounds represented by the following formulae,

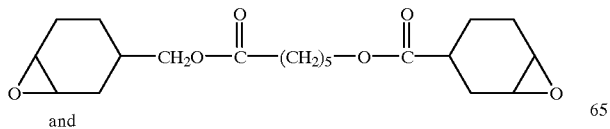

and

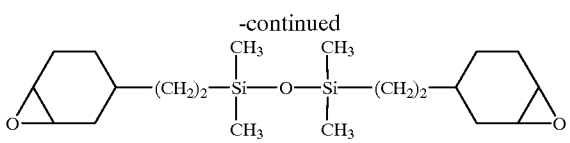

-continued and, optionally (b) an oxetane compound, (B) a modified dimethylsilicone oil with a number average molecular weight of 500–1,000,000 represented by the following formula:

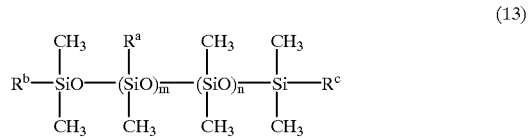

(13)

wherein each of a plurality of $R^a$, $R^b$ and $R^c$ is identical or different and represents methyl group, phenyl group, —$(CH_2)_k$—COOH (wherein k is an integer of 2–6), hydroxyl group, methoxy group, ethoxy group, acetoxy group or polyoxyalkylene group represented by the following formula (14) or (15)

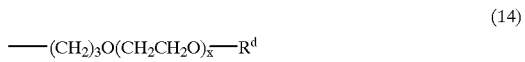

(14)

(15)

where $R^d$ and $R^e$ each represents a hydrogen atom, methyl group or acetyl group and x, y and z each represents an integer of 10–50, and at least one group among a plurality of $R^a$, $R^b$ and $R^c$ represents a hydroxyl group, methoxy group, ethoxy group, acetoxy group or the above-mentioned —(CH$_2$)$_k$—COOH, and m represents a number of 3–50 and n represents a number of 30–200, the modified dimethylsilicone oil having the phenyl group(s) or the polyoxyalkylene groups(s), and (C) a cation-polymerization initiator which forms a cation by irradiation or by heating.

2. A coating composition according to claim 1, wherein the oxetane compound (b) is a compound containing 1–4 oxetane rings represented by the formula

3. A coating composition according to claim 1, where the oxetane compound (b) is selected from the group consisting of 3-ethyl-3-butoxymethyloxetane, 3-ethyl-3-hexyloxymethyloxetane, 3-ethyl-3-methoxymethyloxetane, 3-ethyl-3-ethoxymethyloxetane, 3-ethyl-3-hydroxymethyloxetane, bis(3-ethyl-oxetanyl-3-methyl) oxide, compound represented by the following formula

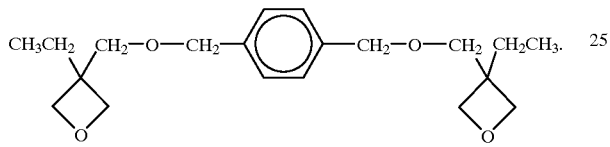

4. A coating composition according to claim 1, wherein the cation-polymerizable binder component (A) comprises 20–100% by weight of an epoxy group-containing compound (a) and 0–80% by weight of an oxetane compound (b) based upon the total of the epoxy group-containing compound (a) and the oxetane compound (b).

5. A coating composition according to claim 1, wherein the cation-polymerizable binder component (A) comprises 40–90% by weight of an epoxy group-containing compound (a) and 10–60% by weight of an oxetane compound (b) based upon the total of the epoxy group-containing compound (a) and the oxetane compound (b).

6. A coating composition according to claim 1, wherein the modified dimethylsilicone oil (B) has a number average molecular weight in the range of 1,000–100,000.

7. A coating composition according to claim 1, wherein the modified dimethylsilicone oil (B) has a viscosity of more than 50 centistokes at 20° C.

8. A coating composition according to claim 1, wherein the modified dimethylsilicone oil (B) has the phenyl group (s).

9. A coating composition according to claim 1, wherein the modified dimethylsilicone oil (B) has the polyoxyalkylene group(s).

10. A coating composition according to claim 1, wherein the modified dimethylsilicone oil (B) has a polyoxyethylene chain(s).

11. A coating composition according to claim 1 containing 0.01–20 parts by weight of the modified dimethylsilicone oil (B) per 100 parts by weight of the cation-polymerizable binder component (A).

12. A coating composition according to claim 1 containing 0.1–10 parts by weight of the modified dimethylsilicone oil (B) per 100 parts by weight of the cation-polymerizable binder component (A).

13. A coating composition according to claim 1, wherein the cation-polymerization initiator (C) is selected from the group consisting of hexafluoroantimonate salt, pentafluorohydroxyantimonate salt, hexafluorophosphate salt, hexafluoroarsenate salt, tetrakis(pentafluorophenyl)borate salt and aromatic sulphonium salt.

14. A coating composition according to claim 1, wherein the cation-polymerization initiator (C) is selected from the group consisting of the compounds represented by the following formulae (I)–(XIV):

wherein Ar represents an aryl group; and X$^-$ represents BF$_4^-$, PF$_6^-$, SbF$_5$(OH)$^-$, BbF$_6^-$, AsF$_6^-$ or a group the following formula:

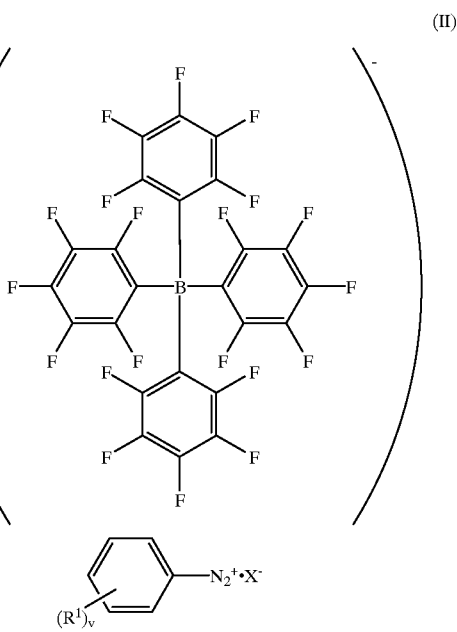

wherein R$^1$ represents an alkyl group of 1–12 carbon atoms or an alkoxy group of 1–12 carbon atoms; v represents an integer of 0–3; and X$^-$ has the same meaning as mentioned above,

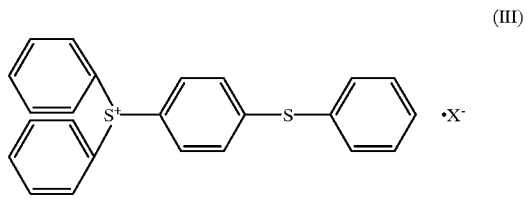

wherein X$^-$ has the same meaning as mentioned above,

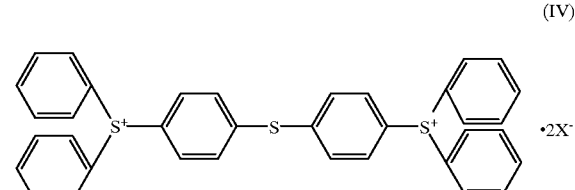

wherein X⁻ has the same meaning as mentioned above, (V)

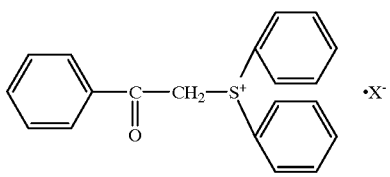

wherein X⁻ has the same meaning as mentioned above, (VI)

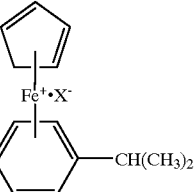

wherein X⁻ has the same meaning as mentioned above, (VII)

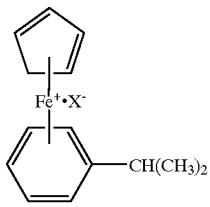

(VIII)

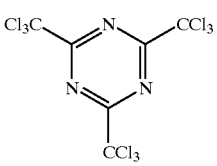

wherein $R^2$ and $R^3$ each independently represents an alkyl group of 1–12 carbon atoms or an alkoxy group of 1–12 carbon atoms, (IX)

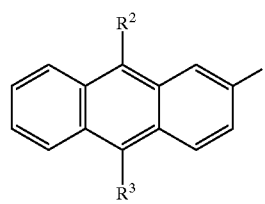

(X)

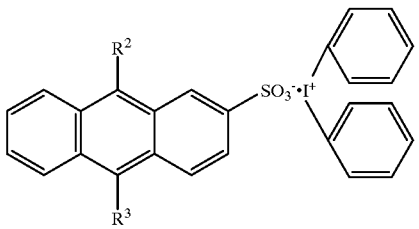

wherein $R^2$ and $R^3$ each has the same meaning as mentioned above, (XI)

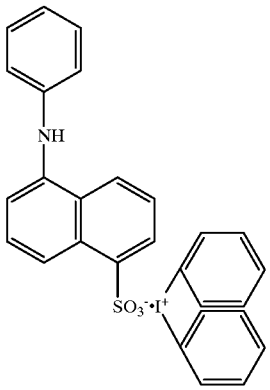

(XII)

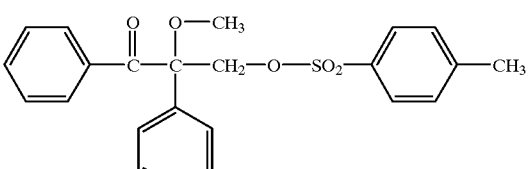

(XIII)

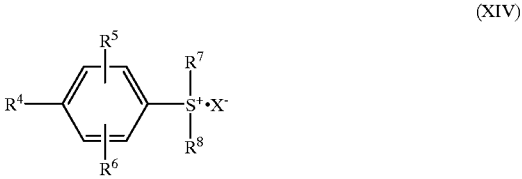

(XIV)

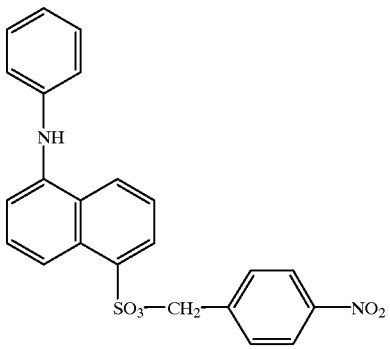

wherein $R^4$ represents a hydrogen atom, a hydroxyl group, an alkoxy group or a group of the following formula:

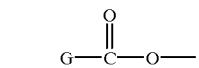

in which G represents an optionally substituted alkyl group, an optionally substituted alkoxy group, an optionally substituted phenyl group or an optionally substituted phenoxy group; $R^5$ and $R^6$ each independently represents a hydrogen atom, a halogen atom or an alkyl group; $R^7$ and $R^8$ each independently represents an optionally substituted alkyl group, an optionally substituted aryl group or an optionally substituted aralkyl group; and $X^-$ has the same meaning as mentioned above.

15. A coating composition composition according to claim 1, wherein the cation-polymerization initiator (C) is a photocation-polymerization initiator which is selected out of the compounds having hexafluorophosphate anion ($PF_6^-$).

16. A coating composition according to claim 1, wherein the cation-polymerization initiator (C) is a thermocation-polymerization initiator which is selected out of the aromatic sulphonium salts represented by the formula (XIV).

17. A coating composition composition according to claim 1 containing 0.01–20 parts by weight of the cation-polymerization initiator (C) per 100 parts by weight of the cation-polymerizable binder component (A).

18. A coating composition composition according to claim 1 containing 0.1–10 parts by weight of the cation-polymerization initiator (C) per 100 parts by weight of the cation-polymerizable binder component (A).

19. A coating composition composition according to claim 1 which further contains a lubricity-imparting agent.

20. A coating composition composition according to claim 19, wherein the lubricity-imparting agent is a wax.

21. A process for producing a coated metal can, which comprises coating a coating composition according to claim 1 on a metal plate, a resin film-laminated metal plate or a metal can obtained by molding of said plate and curing the coated composition by heating and/or irradiating the resulting coated plate or can.

22. A metal can coated with the coating composition of claim 1.

23. A coating composition according to claim 14, wherein Ar in formula (I) is a phenyl group.

* * * * *